INVENTORS
Clifford C. Wrigley
John D. Malloy
BY
THEIR ATTORNEY

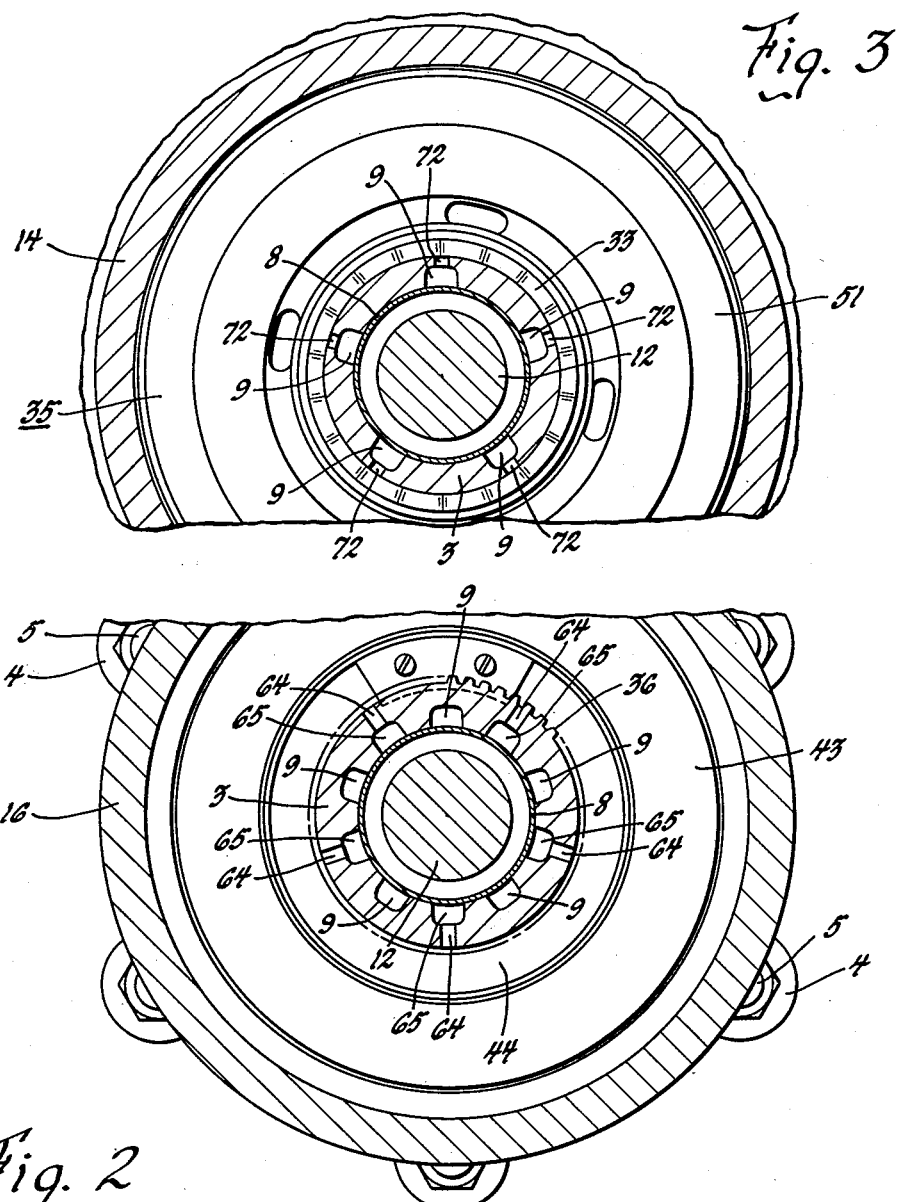

3,044,578
DISK BRAKE
Clifford C. Wrigley, Grosse Pointe Woods, and John D. Malloy, Royal Oak, Mich., assignors to General Motors Corporation, Detroit, Mich., a corporation of Delaware
Filed June 23, 1960, Ser. No. 38,271
3 Claims. (Cl. 188—72)

This invention relates to a vehicle disk brake and more particularly to a compact disk brake which is demountable as a unit from the shaft housing.

In the operation of cargo carrying vehicles a rugged brake having adequate braking capacity is required. Even though the brake has adequate capacity and long life there are times when it is desirable to be able to remove the braking means as a unit. In this manner a standard replaceable unit may be removed at one point and the identical unit may be installed on the vehicle in a minimum of time. The cargo carrying vehicle would then be permitted to continue on its journey. This type of operation is particularly adaptable to the cargo carrying vehicle operating over long distances and operating as one of a fleet of trucks where the braking means may be of standard type. Accordingly, this invention is intended to provide a braking structure which will provide the advantages set forth in the preceding paragraph.

It is an object of this invention to provide a vehicle disk brake having hydraulic fluid actuating means and hydraulic fluid cooling means.

It is another object of this invention to provide a compact demountable braking unit which may be readily removed from the motor vehicle and replaced with a standard unit in a minimum of time.

It is a further object of this invention to provide a means for closing the fluid connections in communication with the vehicle brake in a suitable manner to permit removal of the braking unit and replacement by a similar type of braking unit.

The objects of this invention are accomplished by employing a braking unit which is fastened to the shaft housing of a vehicle wheel. The shaft housing and the braking unit having radial flanges and fastening means for fastening the braking unit. An oil delivery sleeve forms an extension of the shaft housing which supports the braking structure and provides a means for delivering hydraulic fluid for actuating and cooling the vehicle brakes. The vehicle wheel is rotatably mounted about the outer periphery of the oil delivery sleeve which is rigidly fastened to the shaft housing. The drive shaft extends concentrically through an opening in the center portion of the braking structure and is connected to the brake housing which forms the hub section of the vehicle wheel. In this manner, the drive shaft may be removed by unscrewing a plurality of bolts which fasten a radial flange on the drive shaft to the brake housing. The vehicle wheel may then be removed from the brake housing by unscrewing the plurality of wheel bolts.

The fluid connections are provided with a suitable valve means for closing the conduit means leading to openings in the shaft housing. This means may include a valve or a hose clamp or any suitable means for closing off the fluid connections from the external portion of the cooling fluid and brake actuating fluid of the braking structure. The shaft housing and the oil delivery sleeve have radial flanges to provide a rugged mounting from the braking structure but may be readily removed by unscrewing a plurality of bolts which fasten the support structure for the braking means. Once the plurality of bolts fastening the shaft oil delivery sleeve to the shaft housing are removed the braking unit is removed as a unit which includes the wheel bearings, the cooling fluid pump and the hydraulic fluid actuating means.

In assembling a similar unit the reverse of the procedure described above is used and a standard unit may be used to replace the unit which has been removed from the shaft housing. This permits additional time to service the braking unit and yet permits the cargo carrying vehicle to proceed on its journey with all the braking units operating in first class condition.

Further objects and advantages of the present invention will be apparent from the following description, reference being had to the accompanying drawings wherein preferred embodiments of the present invention are clearly shown.

In the drawings:

FIGURE 2 is a cross section view taken on line 2—2 of FIGURE 1.

FIGURE 3 is a cross section view taken on line 3—3 of FIGURE 1.

Figure 1:
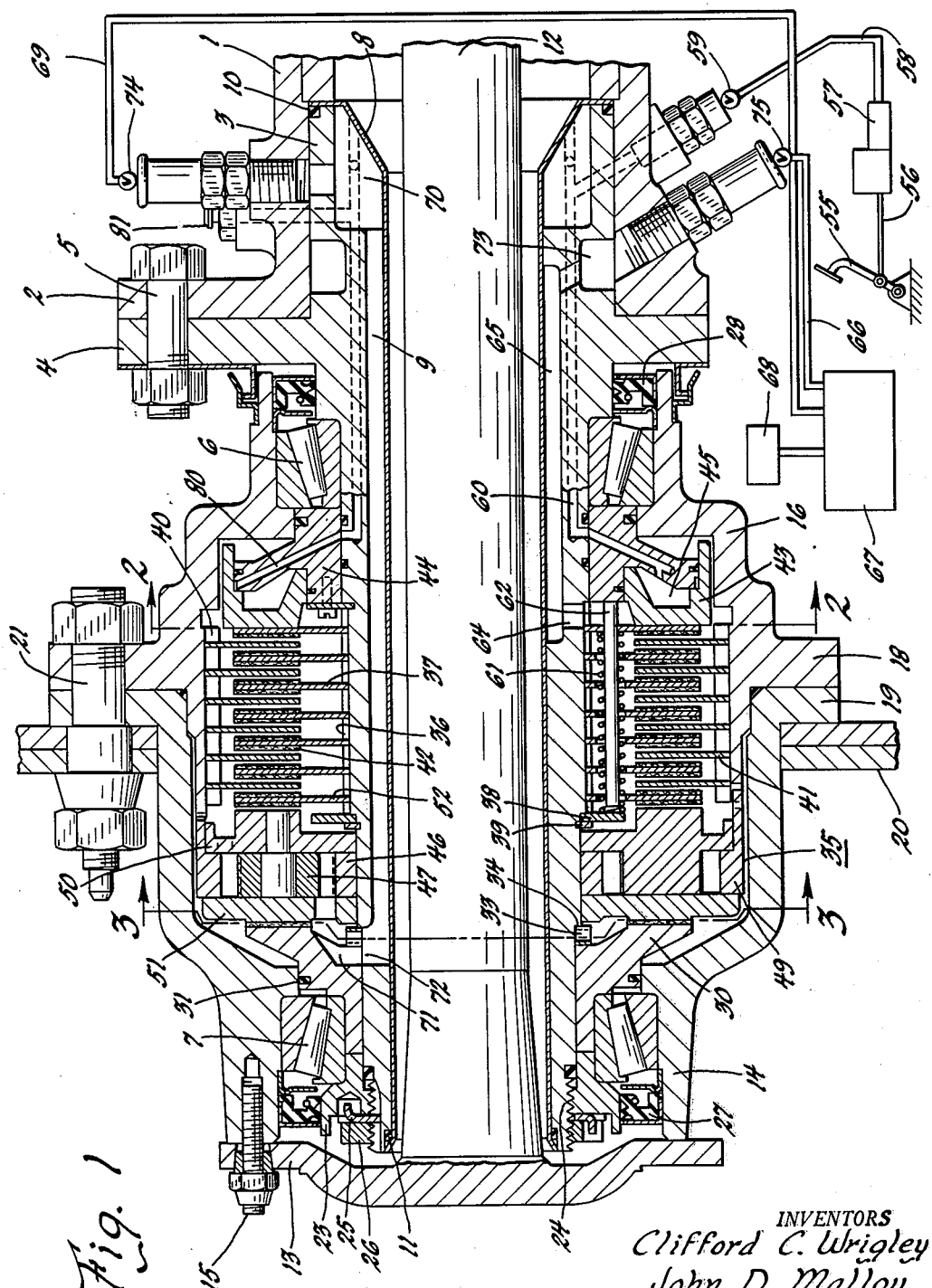
FIGURE 1 is a cross section view of the vehicle disk brake showing the structure for fastening the brake.

FIGURE 1 shows the relative position of the various parts of the braking structure and the vehicle wheel and their means of fastening to the shaft housing. The shaft housing 1 is formed with a radial flange 2 to provide a fastening means for the oil delivery sleeve 3. The oil delivery sleeve 3 has a mating radial flange 4 and a radial facing abutting a mating radial facing of the radial flange 2 to form the mounting means when fastened by the plurality of bolts 5. The inboard end of the oil delivery sleeve extends concentrically within the outboard end of the shaft housing 1. The outboard end of the oil delivery sleeve extends through the braking structure and provides a support for the inboard and outboard bearing assemblies 6 and 7 respectively.

A sheet metal sleeve 8 is placed within the inner periphery of the oil delivery sleeve 3 to form inlet passage means 9 from the inboard end to the outboard end of the sleeve. The sleeve is mounted with a seal 10 abutting the oil delivery sleeve 3 and the sheet metal sleeve 8 to form a seal about the inner periphery on the inboard end of the shaft housing 1. The outboard end of the sheet metal sleeve 8 also is sealed with the seal 11 and the sleeve 8 is crimped to form a permanent assembly with the oil delivery sleeve 3 and the sheet metal sleeve 8.

The drive shaft 12 extends axially outboard to form the radial flange 13 which is fastened to the radially outer brake housing 14 by means of a plurality of bolts 15. The outer brake housing 14 receives the radially inner brake housing 16 to form an enclosure for the bearing assemblies 6 and 7 and the braking means together with the cooling fluid pump.

The inner brake housing 16 and the outer brake housing 14 are provided with radial flanges 18 and 19 respectively, to form a mounting means for the wheel 20. The wheel 20 is fastened by means of a plurality of wheel bolts 21.

The outer brake housing 14 and the inner brake housing 16 form the hub section for the vehicle wheel 20. The hub section is rotatably mounted on the inboard bearing assembly 6 and the outboard bearing assembly 7. The bearing assemblies being mounted on the outer periphery of the oil delivery sleeve 3 are adjusted by means of the annular bearing adjusting nut 23. The bearing adjusting nut 23 is received on the threaded portion 24 on the outer periphery in the outboard end of the oil delivery sleeve 3.

The annular bearing adjusting nut 23 is locked in position by the lock washer 25 and the lock nut 26. The outboard bearing assembly 7 is provided with a seal assembly 27 and the inboard bearing assembly is also sealed from the atmosphere by the seal assembly 28.

The braking means includes a reaction plate 30 which supports the inboard end of the outboard bearing assembly 7 and is sealed by the seal 31. The reaction plate 30 is mounted between the adjusting nut 23 and a corrugated spring 33 which is seated on a shoulder 34 of the oil delivery sleeve 3. The corrugated spring 33 maintains the reaction plate in a contacting position on the inboard end of the annular adjusting nut 23.

The cooling fluid pump 35 is concentrically mounted about the outer periphery of the oil delivery sleeve 3 and is spaced between the brake disks and the reaction plate 33. The intermediate portion of the oil delivery sleeve is provided with a spline portion 36 for receiving the mating spline portion of the plurality of stationary brake disks 37. The brake disks are retained in this position by the annulus 38 held in position by the snap ring 39. The inner periphery of the inner brake housing 16 also has a spline portion 40. The spline portion 40 receives the plurality of rotating disks 41 which have a mating spline section.

The stationary brake disks 37 have frictional material 42 on their inboard and outboard planar surfaces for engagement of the rotating brake disks 41. The friction material has grooves formed from the inner to the outer periphery for passage of fluid. The disk stack formed by the plurality of rotating disks 41 and stationary disk 37 is compressed against the cooling fluid pump 35 which, in turn, contacts the reaction plate 30. The compression of the disk stack is accomplished by the annular hydraulic piston 43 operating within the annular hydraulic cylinder 44. Suitable seals are provided to form a fluid tight actuating chamber 45 within the hydraulic cylinder 44 and the piston 43.

The cooling fluid pump 35 includes a sun gear 46 rotatably mounted on the outer periphery of the oil delivery sleeve 3. The sun gear 46 meshes with a plurality of planetary gears 47. Engaging the plurality of planetary gears is also a ring gear 49. The gears are held in their relative axial position by means of the pump housing 50 and the pump cover plate 51. The ring gear 49 has a radial spline for connecting the inner brake housing 16 to provide rotation of the ring gear 49 at all times when the inner brake housing 16 is in rotation. The housing 50 also rotates with the pump assembly 35 when the vehicle brakes are not actuated. When the brakes are actuated, however, the pump housing 50 is retarded by the frictional engagement with the outboard stator brake disks 52. The cover plate 51 also engages the reaction plate 30 further applying the retarding force and thereby actuating the cooling fluid pump. The cooling fluid pump operates by the planetary gears meshing the ring gear 49 and the sun gear 46.

The vehicle brakes are actuated by a brake pedal 55 operating through a push rod 56 to pressurize fluid within the master cylinder 57. The master cylinder is in communication with the conduit 58. The conduit 58 is provided with a suitable valve 59 which may be closed for dismantling of the brake unit from the shaft housing 1 when the brake unit is replaced by a similar unit.

The conduit 58 is also in communication with the actuating passage 60 which leads to the pressurizing chamber 45. The pressurizing chamber 45 biases the piston 43 axially to compress the disk stack and thereby actuate the vehicle brakes.

As the vehicle brakes are released the retraction spring 61 biases the piston 43 through a normally retracted position. The retraction spring 61 is maintained in its position by the pin 62. A plurality of retraction springs 61 and pins 62 are angularly located about the inner periphery of the disk stack.

The cooling fluid system includes the cooling fluid pump 35 which pumps cooling fluid through the disk stack to the inner periphery of the braking means. The fluid is then transmitted through the radial passage 64 and the axial passage 65 to the conduit 66. The conduit 66 feeds into the reservoir and heat exchanger 67. The reservoir 67 is connected to an expansion chamber 68 to provide for variations of volume in the cooling fluid system in response to temperature changes. The reservoir 67 is in communication with the return conduit 69. The return conduit 69 feeds into the chamber 70 which is in communication with the axially extending passage 9 which extends about the outer periphery of the sheet metal sleeve 8. The plurality of passages 9 are in communication with the input chamber 71 through the radially extending passages 72. The structural arrangement of the passages feeding into the inlet side of the cooling fluid pump are more clearly shown in FIGURE 3. The inlet passages to the pump 35 are formed in the cover plate 51 on the inlet side of the cooling fluid pump.

FIGURE 2 illustrates the radial passages 64 on the outlet side of the vehicle brakes for the cooling fluid system. The passage 64 is in communication with an axial passage 65 which extends axially to communicate with the chamber 73 which is in communication with the conduit 66. The cooling fluid system is provided with a valve arrangement for closing off the inlet and outlet passages of the cooling fluid system. These valves 74 and 75 may be of any suitable means for obstructing the flow of the cooling fluid prior to disengagement of the brake unit. The valves are retained in the closed position until the new brake unit is installed upon the shaft housing 1 at which time the cooling fluid valves 74 and 75 are again open to permit the flow of cooling fluid to the braking system.

The vehicle disk brake unit may be dismantled in the following described manner. The vehicle wheel 20 may be removed from the radial flanges 18 and 19 of the brake housing by loosening the plurality of bolts 21. The drive shaft 12 is then removed by unfastening through the plurality of bolts 15 on the end of the brake housing which lock the radial flange 13 of the shaft 12 to the outer brake housing 14. The valve 59 is then turned to the closed position to close off the fluid actuating system for actuation of the vehicle brakes. The cooling fluid valves 74 and 75 are then closed to prevent the fluid from the cooling system from running from the external system. The plurality of bolts 5 are then removed permitting the oil delivery sleeve to be loosened from the shaft housing 1. It is then noted that when the oil delivery sleeve is removed the internal sheet metal sleeve 8 is also carried with the oil delivery sleeve 3 as a unit. The oil delivery sleeve 3 provides the base support for the bearings and the braking structure and in this manner the whole unit is removed by sliding the assembly outboard. The brake unit may then be placed on a fixture or some suitable means for holding for further dismantling of the braking structure to accomplish the necessary repairs which may be required.

A unit similar to that removed from the shaft housing 1 is then placed on the shaft housing and fastened by means of the plurality of bolts 5. The valves 74 and 75 and 59 are then turned to the open position to place the external cooling fluid and actuating systems in operation with the vehicle brake. The brake actuating system at this point should be bled to remove air from the system. This is accomplished by depressing the brake pedal 55 and pressurizing fluid in the master cylinder as well as the pressurizing chamber 45 of the annular hydraulic wheel cylinder. The fluid forces air through the conduit 80 and out through the opening closed by the nut 81 when the nut is removed. When all of the air is forced out of the system the plug 81 is again replaced in the bleeder system and the vehicle brakes are ready for operation.

The drive shaft 12 is then replaced within the braking structure and fastened to the outboard side of the outer brake housing 14. The wheel 20 is again replaced on the outer periphery of the brake housing. The cooling fluid system operates as the wheel rotates thereby circulating cooling fluid through the braking system. The excess air within the system is carried to the reservoir 67 and is vented through the reservoir through a suitable means.

While the embodiments of the present invention as herein disclosed, constitute preferred forms, it is to be understood that other forms might be adopted.

What is claimed is as follows:

1. A vehicle disk brake comprising in combination, a support member, a demountable braking unit having actuating fluid passage means therein and including, a stationary member engaging said support member, at least one stationary brake disk connected to said stationary member, a rotating member rotatably mounted on said stationary member, at least one rotating brake disk connected to said rotating member for frictionally engaging said stationary brake disk when said vehicle brakes are actuated, hydraulic means for actuating said vehicle brakes, an inlet port in said support member connecting with said hydraulic actuating means, cooling fluid passage means in said vehicle brake, external inlet and outlet vents in said support member and in communication with said cooling fluid passage means, external fluid means comprising hydraulic fluid pressurizing means, external hydraulic actuating fluid conduit means connected to said inlet port in said support member and communicating with said pressurizing means and said actuating fluid passage means in said demountable braking unit, valve means in said actuating fluid conduit means, cooling fluid conduit means for circulating a cooling fluid in communication with said inlet and said outlet vents in said demountable braking unit, valve means in said external cooling fluid conduit means, and fastening means connecting said support member with said stationary member and permitting removal of said demountable braking unit from said support member.

2. A vehicle disk brake comprising in combination, a support member having actuating fluid passage means therein, a demountable braking unit including a stationary member for connecting to said support member and having actuating fluid passage means therein connectable with said support member actuating fluid passage means, at least one stationary brake disk connected to said stationary member, a brake housing rotatably mounted on said stationary member, at least one rotating brake disk connected to said brake housing for frictionally engaging said stationary brake disk when the vehicle brakes are actuated, hydraulic means for actuating said vehicle brakes, means on said brake housing adapted for supporting a vehicle wheel, fastening means on said wheel supporting means to permit removal of said vehicle wheel from said brake housing, a central opening in said demountable brake unit adapted for reception of a shaft means, shaft fastening means adapted for connecting said shaft means to said brake housing, cooling fluid passage means in said demountable braking unit, cooling fluid inlet and outlet vents in said support member connected to said cooling fluid passage means, external fluid means including, actuating fluid pressurizing means, actuating fluid conduit means connected to said pressurizing means and said support member actuating passage means, actuating fluid valve means in said conduit means, external cooling fluid conduit means in communication with said inlet vent and said outlet vent, valve means in said external cooling fluid conduit means, and fastening means connecting said support member with said stationary member and permitting dismantling of said demountable brake unit from said support member.

3. A vehicle disk brake comprising in combination, a support member having a radial flange, a demountable braking unit comprising, a stationary member mounted on said support member and having a mating radial flange for engaging said flange on said support member, at least on stationary brake disk connected to said stationary member, a brake housing rotatably mounted about the outer periphery of said stationary member, at least one rotating brake disk connected to said brake housing for frictionally engaging said stationary brake disk when said vehicle brakes are actuated, a cooling fluid pump concentrically mounted about the outer periphery of said stationary member, means on the outer periphery of said brake housing adapted for supporting and fastening a vehicle wheel, means forming a central opening in said stationary member adapted for reception of a drive shaft extending concentrically with the central portion of said demountable braking unit, means on said brake housing for fastening said drive shaft to said brake housing, fluid actuating means in said demountable braking unit, actuating fluid passage means in communication with said actuating means, cooling fluid passage means in communication with said cooling fluid pump extending to an inlet and outlet portion in said support member, fluid means external of said demountable braking unit including, actuating fluid pressurizing means, actuating fluid conduit means communicating with said actuating fluid passage means and said actuating fluid pressurizing means, valve means in said actuating fluid conduit means, cooling fluid conduit means in communication with said cooling fluid passage means, valve means in said cooling fluid conduit means, fastening means for the connecting of said radial flange of said support member to said radial flange of said stationary member thereby providing a means for dismantling of said demountable braking unit from said support member.

References Cited in the file of this patent

UNITED STATES PATENTS

| 2,096,341 | Roberts | Oct. 19, 1937 |
| 2,556,809 | Hobbs | June 12, 1951 |
| 2,828,840 | Kelley et al. | Apr. 1, 1958 |
| 2,955,678 | Schjolin et al. | Oct. 11, 1960 |
| 2,968,368 | Schjolin et al. | Jan. 17, 1961 |